United States Patent [19]
Kim et al.

[11] Patent Number: 6,016,176
[45] Date of Patent: Jan. 18, 2000

[54] LIQUID CRYSTAL DISPLAY DEVICE WITH A FLEXIBLE LIQUID CRYSTAL CELL THAT IS FOLDED

[75] Inventors: Si-Hwan Kim, Seoul; Kyu-Suk Kim, Kyonggi-do; Mee-Kyung Kim, Seoul, all of Rep. of Korea

[73] Assignee: Samsung Display Devices Co., Ltd., Rep. of Korea

[21] Appl. No.: 09/247,485

[22] Filed: Feb. 10, 1999

[30] Foreign Application Priority Data

May 30, 1998 [KR] Rep. of Korea ....................... 98-20042

[51] Int. Cl.$^7$ ................................................. G02F 1/1333
[52] U.S. Cl. ............................................... 349/84; 349/158
[58] Field of Search ........................................ 349/84, 158

[56] References Cited

U.S. PATENT DOCUMENTS 5,905,550  5/1999  Ohgami et al. ........................... 349/58

*Primary Examiner*—William L. Sikes
*Assistant Examiner*—Heidi L. Eisenhut
*Attorney, Agent, or Firm*—Baker & McKenzie

[57] ABSTRACT

An electronic apparatus includes an LCD device having at least one flexible portion, a main body having the front, rear, right and left sides, and a coupling member for coupling the LCD device to the main body. The LCD device have a screen size more than twice the total upper surface of the main body, and thus completely wrap the upper surface, the front side, and the bottom surface of the main body. The front side of the main body is rounded to allow the LCD device to bend without a sharp 90° angle, which would be stressful to the bent portion. The LCD device includes a liquid crystal cell, a reinforcement plate disposed on the liquid crystal cell, and at least two strip-shaped recesses formed by removing portions of the reinforcement plate in said at least one flexible portion.

10 Claims, 5 Drawing Sheets

LIQUID CRYSTAL DISPLAY DEVICE WITH A FLEXIBLE LIQUID CRYSTAL CELL THAT IS FOLDED

BACKGROUND OF THE INVENTION

1. Field of the Invention

The present invention is related to a portable electronic apparatus, such as a notebook computer or hand-held meter, having as its display a liquid crystal display (LCD) panel, more particularly, a flexible one which allows the overall size of the portable electronic apparatus to be reduced in a carrying mode.

2. Description of the Prior Art

LCD devices are widely used as a display portion in a variety of portable electronic apparatus because they are not only thin and light but have an advantage of low electrical power consumption.

Despite a need to make a portable device as small as possible the conventional LCDs succeeded only in reducing the thickness of it. But reduction in its planar dimensions was limited because the display is preferred to be as large as possible for easy readability. In other words there is a conflicting demand to reduce the overall volume of the portable device and yet to make its display portion large.

In an attempt to overcome this drawback, an LCD having multiple sections which are connected to each other with joints and thus foldable was proposed. But it has its own disadvantages of deteriorated display quality at those joints.

SUMMARY OF THE INVENTION

Therefore, the present invention has been made in an effort to solve the above described problems.

It is an objective of the present invention to provide a flexible liquid crystal display (LCD) device which is flexible without the use of a joint, thereby reducing a portable size of an electronic apparatus when applied to the same while providing an enlarged display screen size without deteriorating display quality.

It is another objective of the present invention to provide an electronic apparatus with a flexible LCD device which can reduce a portable size of the apparatus while increasing a display screen size.

To achieve the above objectives, the present invention provides an LCD device flexible in at least one portion. The LCD device comprises a liquid crystal cell, a reinforcement plate disposed on an outer surface of the liquid crystal cell, and at least two strip shaped recesses formed by removing portions of the reinforcement plate in the flexible portion, whereby the LCD device is flexed without any joint.

The LCD device may further comprise a flexible film attached on the reinforcement plate, a circuit board coupled to the liquid crystal cell, a driver coupled to the circuit board via a tab integrated circuit, and a flexible printed circuit for connecting the liquid crystal cell to the circuit board.

According to another aspect of the present invention, an electronic apparatus has a structure for coupling the above described LCD device.

That is, the electronic apparatus comprises an LCD device having at least one flexible portion, a main body having front, rear, right and left sides, and a coupling member for coupling the LCD device to the main body.

The LCD device can have a screen size more than twice the total upper surface of the main body, and thus completely wrap the upper surface, the front side, and the bottom surface of the main body. The front side of the main body is rounded to allow the LCD device to bend without a sharp 90° angle, which would be stressful to the bent portion.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENTS

The preferred embodiment of the invention will be described referring to the accompanying drawings. Wherever possible the same reference numbers will be used throughout the drawings to refer to the same or like parts.

Figure 1:
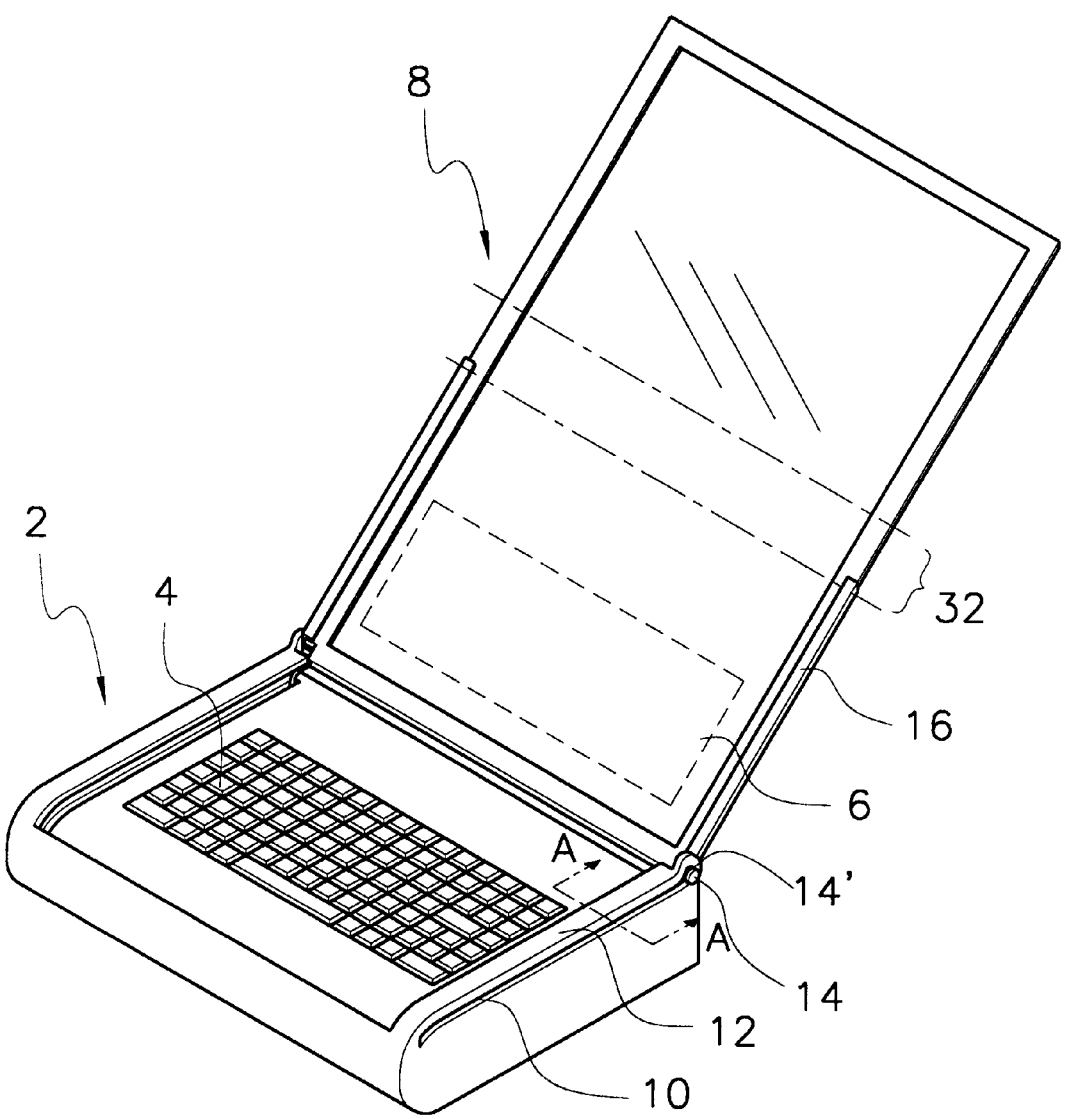
FIG. 1 is a perspective view illustrating an electronic apparatus with a flexible LCD device according to a preferred embodiment of the present invention.

Referring first to FIG. 1, there is shown an electronic apparatus with a flexible liquid crystal display (LCD) device according to a preferred embodiment of the present invention.

The electronic apparatus according to a preferred embodiment of the present invention comprises a main body 2 and an LCD device 8.

The main body 2 of the portable computer has a rounded front side, and the LCD device 8, optionally provided with a touch panel portion 6, pivotally coupled to the main body 2 at the rear periphery of the upper surface. A keyboard is formed on the upper surface of the main body 2.

Describing more in detail, guides 12 are formed along left and right peripheries of the main body 2 such that they are raised from the upper surface of the main body 2. The rear ends of the guides 12 have pivot holes 14' into which pivot shafts 14 extending from the lower corners of the LCD device 8 are inserted. The guides 12 are further provided along their length with guide slots 10 from the pivot holes 14' to the rounded front side such that the pivot shafts 14, inserted into the pivot holes 14', can slidably move along in the guide slots 10.

Frames 16 are formed along right and left sides of the LCD device 8 such that they are aligned with the guides 12. Accordingly, the frames 16 can be stably disposed within the guides 12 when the LCD device is slidably inserted into the guides 12, thereby preventing the LCD device 8 from deforming.

Figure 2:
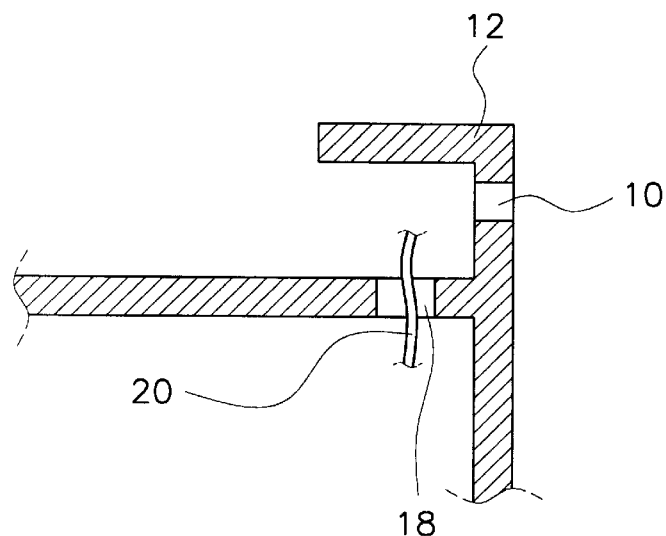
FIG. 2 is a sectional view taken along line A—A of FIG. 1.

Particularly, to electrically connect the LCD device 8 to a processor disposed inside the main body 2, as shown in FIG. 2, a slit 18 is formed on the upper surface of the main body 2 under one of the guides 12. That is, connectors 20 are led out of the main body 2 through the slit 18, then electronically coupled to the LCD device 8. The connectors 20 move along the slit 18 when the LCD device 8 is inserted into and withdrawn from the guides 12.

Figure 3:
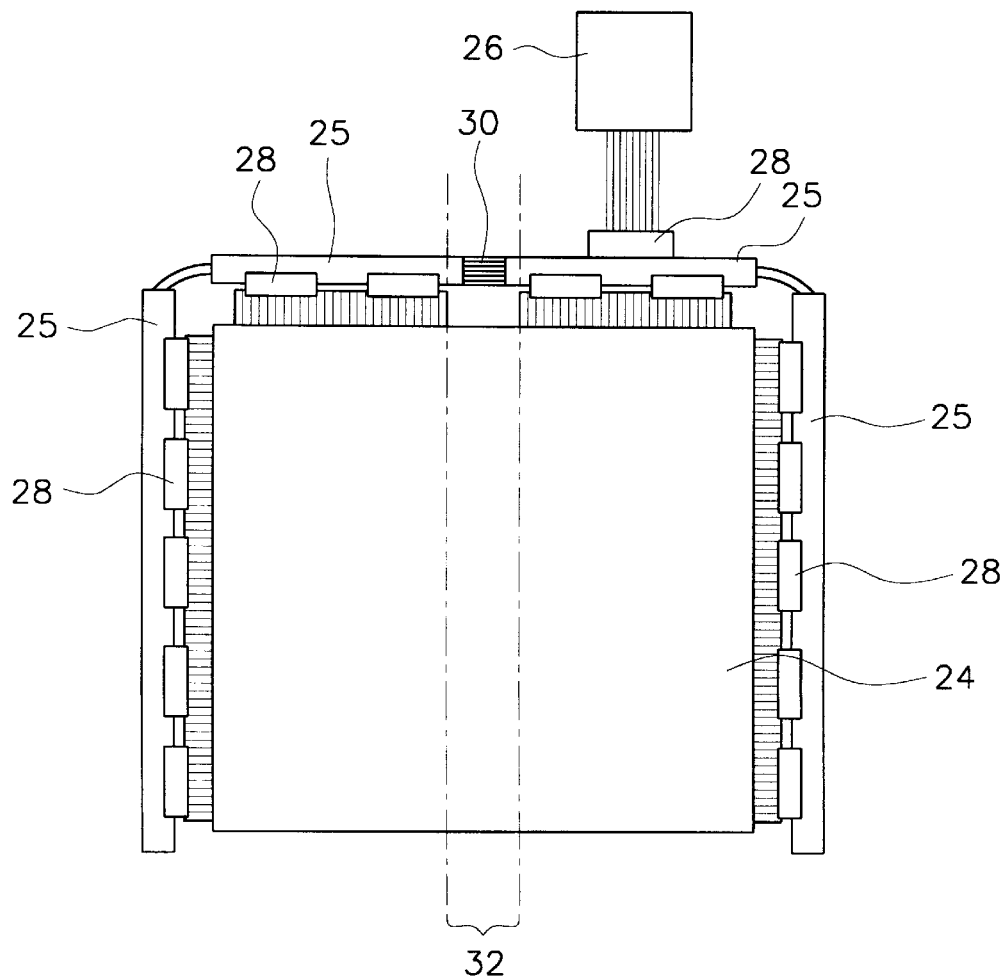
FIG. 3 is a plane view illustrating a module portion of an liquid crystal cell according to a preferred embodiment of the present invention.
Figure 4:
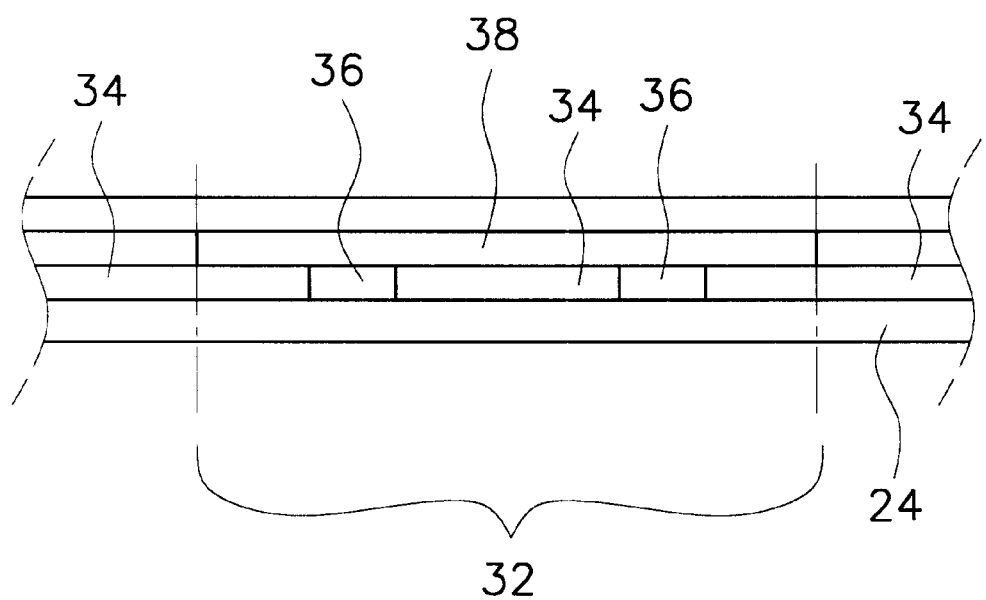
FIG. 4 is a sectional view illustrating a curved portion of a flexible LCD device according to a preferred embodiment of the present invention.

As shown in FIGS. 3 and 4, the LCD device 8 comprises a liquid crystal cell 24, a circuit board 25 coupled to the liquid crystal cell 24 and a driver 26 coupled to the circuit board 25 via a tab integrated circuit 28.

Describing more in detail, the liquid crystal cell 24 is coupled to the circuit board 25 via a flexible printed circuit (FPC) 30 for data communication there between. Thus, even when the LCD device 8 is folded or bent, reliable data communication is still possible without the risk of loss to data.

The LCD device 8 is designed such that a flexible portion 32 formed on a middle portion thereof can be bent over the rounded front side of the main body 2. A reinforcement plate 34 is disposed on an outer surface of the liquid crystal cell 24, then at least two strip-shaped recesses 36 are formed on the reinforcement plate 34 by removing portions of the reinforcement plate 34. Accordingly, the reinforcement plate 34 serves to maintain a shape of the LCD device 8 when it is unfolded, and the at least two recesses 36 allow the LCD device 8 to be bent over the rounded front side of the main body 2.

A flexible film 38 may attach on the reinforcement plate 34 so that the LCD device 8 can be smoothly bent and returned to its flat state.

As described above, since the LCD device 8 is designed to be bendable without the use of a joint, display quality is not reduced.

Preferably, the flexible portion 32 may be formed on more than one portion of the LCD device 8.

FIGS. 5a to 5d show operating modes of the flexible LCD device coupled to the portable computer.

Figure 5A:
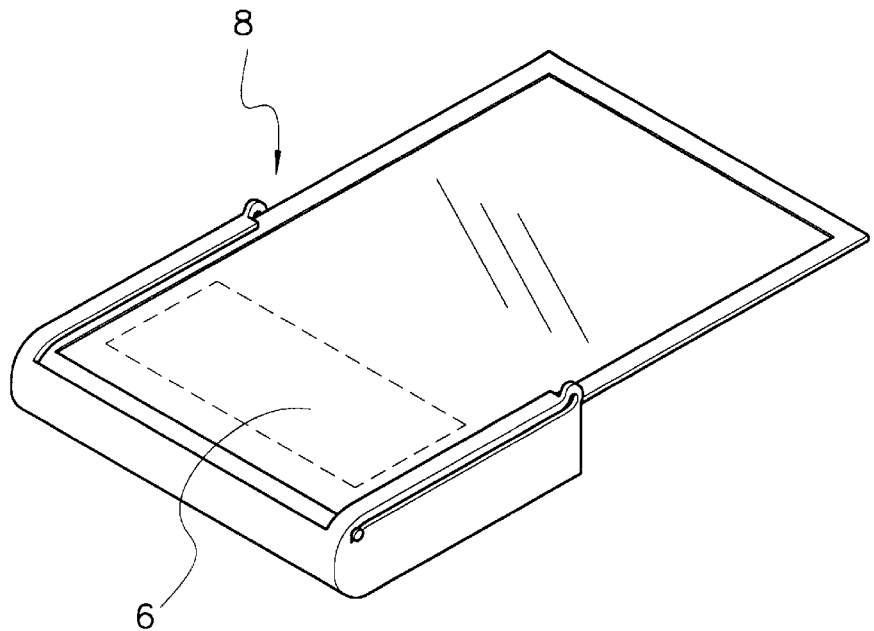
FIGS. 5a to 5d are perspective views illustrating operation modes of a flexible LCD device to an electronic apparatus.

First FIG. 5a shows the LCD device 8 whose frames are slidably inserted into the guides 12. In this case, since the keyboard is covered by the LCD device 8, data may be inputted through the optional touch panel 6.

Figure 5B:
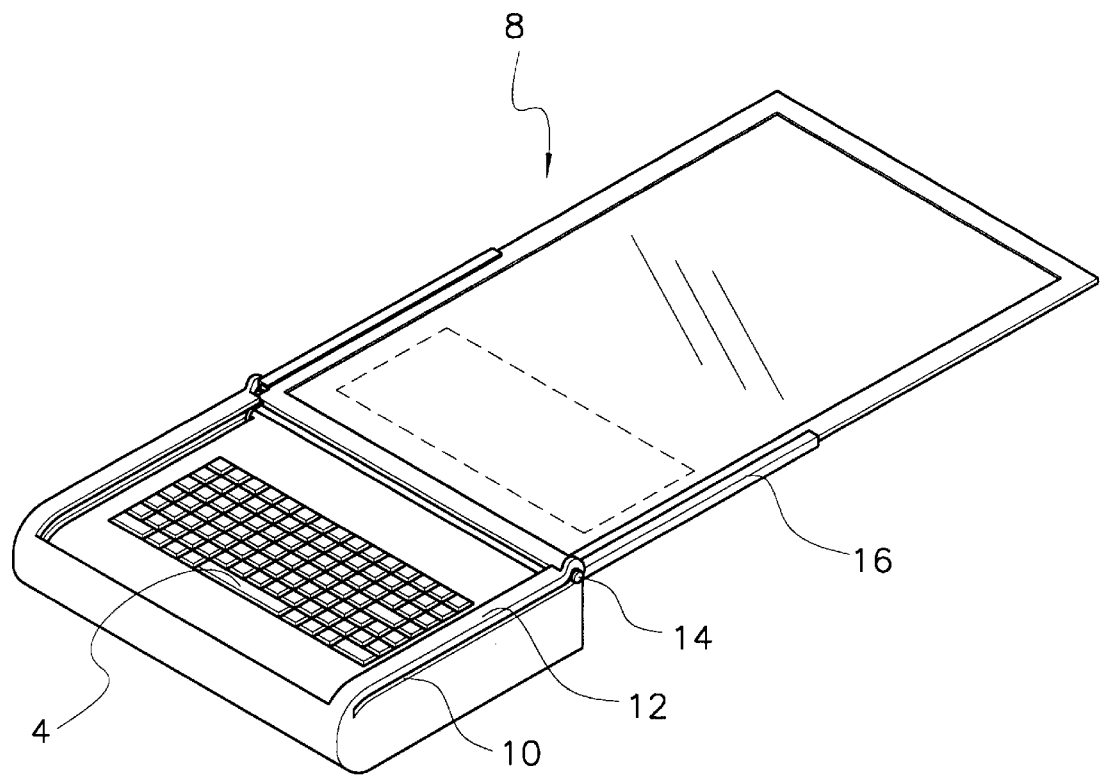

When the user desires to use the keyboard 4, as shown in FIG. 5b, the LCD device 8 is simply slide out from the guides 12. That is, when pulling the LCD device 8, the pivot shaft 14 moves along the guide slot 10 to remove the frames 16 out of the guides 12, thereby exposing the keyboard 4.

Figure 5C:
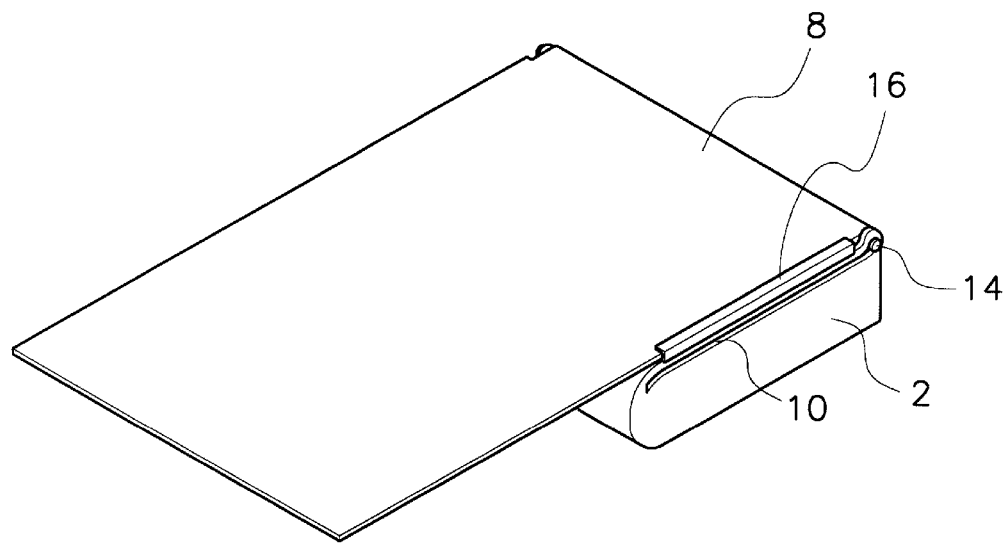
Figure 5D:
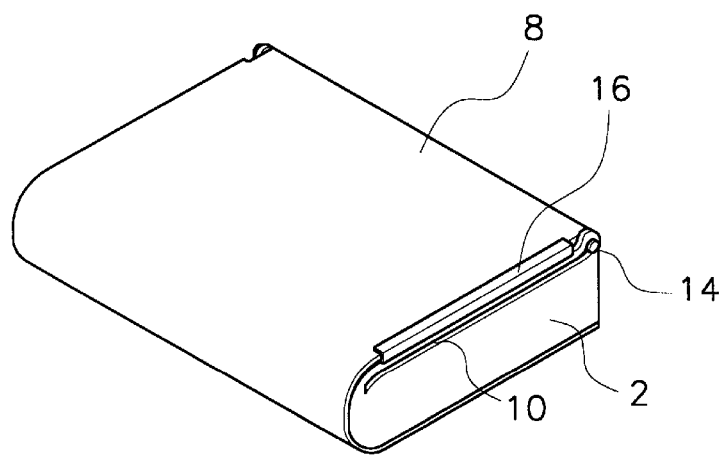

To fold or bend the LCD device 8 over the main body 2 for carrying or storage, as shown in FIG. 5c, it is pivoted about pivot axis such that the frames 16 come into contact with the upper surface of the guides 12. Then, the LCD device 8 is folded around the rounded front side of the main body 2 so that the flexible portion 32 is bent with the same roundness of the rounded front side of the main body 2, as shown in FIG. 5d.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. An LCD device flexible in at least one portion, comprising:

a liquid crystal cell;

a reinforcement plate disposed on the liquid crystal cell; and at least two strip-shaped recesses in the reinforcement plate in said at least one portion of the LCD at which the LCD can be bent.

2. The LCD device according to claim 1 further comprising a flexible film attached on the reinforcement plate.

3. The LCD device according to claim 1 further comprising a circuit board coupled to the liquid crystal cell, and a driver coupled to the circuit board via a tab integrated circuit.

4. The LCD device according to claim 3 further comprising a flexible printed circuit for connecting the liquid crystal cell to the circuit board.

5. An electronic apparatus comprising:

an LCD device with a liquid crystal cell having at least one flexible portion;

a body portion having front, rear, right and left sides as well as upper and bottom surfaces; and a coupling member for coupling the LCD device to the body portion, wherein the surface area of the LCD device is greater than the area of the upper surface of the body portion and the LCD device is bendable in said at least one flexible portion around the front side so as to cover the bottom surface of the body portion.

6. The electronic apparatus according to claim 5 wherein the front side of the body portion is round.

7. The electronic apparatus according to claim 5 wherein the coupling member comprises guides formed along the right and left peripheries of the front surface of the body portion and the right and left ends of the LCD device are slidably inserted into and withdrawn from the guides, which further comprise a pivot hole, formed on the rear ends of each of the guides, into which pivot shafts protruding from the LCD device are inserted and a guide slot, extending from the pivot hole, such that the pivot shafts can slide inside the slots for the insertion and withdrawal of the right and left ends of the LCD into the guides.

8. The electronic apparatus according to claim 7 wherein the LCD device comprises:

a liquid crystal cell;

a reinforcement plate disposed on the liquid crystal cell; and at least two strip-shaped recesses formed by removing portions of the reinforcement plate in said at least one flexible portion.

9. The LCD device of claim 8 further comprising a flexible film attached on the reinforcement plate.

10. The LCD device of claim 8 further comprising a circuit board coupled to the liquid crystal cell, and a driver coupled to the circuit board via a tab integrated circuit.

* * * * *